United States Patent [19]
Berry et al.

[11] Patent Number: 6,081,270
[45] Date of Patent: Jun. 27, 2000

[54] METHOD AND SYSTEM FOR PROVIDING AN IMPROVED VIEW OF AN OBJECT IN A THREE-DIMENSIONAL ENVIRONMENT ON A COMPUTER DISPLAY

[75] Inventors: Richard Edmond Berry; Scott Harlan Isensee, both of Georgetown; Didier Daniel Bardon, Austin, all of Tex.

[73] Assignee: International Business Machines Corporation, Armonk, N.Y.

[21] Appl. No.: 08/789,342

[22] Filed: Jan. 27, 1997

[51] Int. Cl.[7] ...................................................... G06F 3/03
[52] U.S. Cl. ............................................................ 345/419
[58] Field of Search .................................. 345/429, 420, 345/421

[56] References Cited

U.S. PATENT DOCUMENTS 5,261,044  11/1993  Dev et al. .
5,276,785   1/1994  Mackinlay et al. .
5,345,550   9/1994  Bloomfield ............................. 395/156
5,528,735   6/1996  Strasnick et al. ....................... 345/427

OTHER PUBLICATIONS

Mackinlay, Jock D.; Card, Stuart K.; Robertson, George G.; "Rapid Controlled Movement Through a Virtual 3D Workspace", *Computer Graphics*, vol. 24, No. 4, Aug. 1990.

*Primary Examiner*—Phu K. Nguyen
*Assistant Examiner*—Cliff N. Vo
*Attorney, Agent, or Firm*—Sawyer & Associates; Volel Emile

[57] ABSTRACT

The present invention provides a method and system for providing an improved view of an object on a display in a computer system, via a user event. The method comprises the step of providing a three-dimensional environment on the display, the three-dimensional environment including a plurality of objects, each of the plurality of objects appearing to be three-dimensional. The method and system further comprises providing a two-dimensional representation of at least one of the plurality of objects responsive to the user event.

15 Claims, 6 Drawing Sheets

METHOD AND SYSTEM FOR PROVIDING AN IMPROVED VIEW OF AN OBJECT IN A THREE-DIMENSIONAL ENVIRONMENT ON A COMPUTER DISPLAY

CROSS-REFERENCE TO RELATED APPLICATIONS

The present application is related to application Ser. No. 08/789,388, entitled "A Method and System for Providing Visual Hierarchy of Task Groups and Related Viewpoints of a Three-Dimensional Environment in a Display of a Computer System," application Ser. No. 08/789,343, entitled "A Method and System for Classifying User Objects in a Three-Dimensional (3D) Environment on a Display in a Computer System," application Ser. No. 08/789,345, entitled "A Method and System for Providing Preferred Face Views of Objects in a Three-Dimensional (3D) Environment on a Display in a Computer System," application Ser. No. 08/789,344, entitled "Method and System for Navigating Through Opaque Structures on a Display," and application Ser. No. 08/789,341, entitled "A Method and System for Effectively Controlling an Object in a Three-Dimensional Environment in a Display of a Computer System," filed on the same date as the present application and assigned to the assignee of the present application.

TECHNICAL FIELD

The present invention relates generally to organizing objects, navigating and using objects within a three-dimensional (3D) environment within a display in a computer system and more particularly relates to providing a classification of user objects in such a display.

BACKGROUND

Presently in a computer environment the screen or display on the computer has a plurality of icons and windows thereon. In a typical environment including a window and a pointing device, to access certain information it is important to point to and then click on a particular icon or window. Oftentimes, this type of environment is not efficient unless the user has a specific understanding of the particular nomenclature and syntax of the particular environment of the computer. Hence, a user that is not familiar with that syntax or nomenclature could become easily confused and spend a significant amount of time trying to understand how to navigate and access certain information. This can cause user frustration as well as create considerable inefficiency in the system.

Three dimensional (3D) presentations are known, for example, to be utilized in computer games or virtual reality world environments in a computer system. User interaction with objects in 3D spaces, such as found in computer games and in virtual reality world environments using virtual reality modeling language (VRML) on the Internet, is made difficult by the perspective projection inherent in 3D presentation. In addition, a computer game is not an environment where useful work is accomplished, such as in a business environment. Commonly understood user controls, such as buttons, sliders, and text entry fields cannot be easily used when viewed from an angle. Ease of use and productivity will be crucial aspects of making 3D user environments easy to use and productive.

For example, while navigating in the 3D world the user might find a calculator within of a desk. Using the calculator at the angle of view in effect when the user discovered it would not be practical due to the angles involved. Moving the viewpoint to be perpendicular to the desk drawer would also not be practical as the user might have to move "into" the drawer to be close enough to see an appropriate level of detail on the calculator. Perpendicular viewing has the additional disadvantage of being disorienting and does not facilitate the gathering and use of multiple objects at the same time in the performance of a single task.

What is needed is a system and method for enhancing the use of certain aspects of a 3-D environment where useful work is done on a computer display, without creating undue complexity. The system should be easy to implement and compatible with existing computer systems. The present invention addresses such a need.

SUMMARY

In a first aspect, the present invention provides an improved view of an object in a three dimensional environment on a display in a computer system via a user event. The method comprises defining a work plane in front of a three dimensional (3D) presentation. The method further provides a two-dimensional (2D) view of the object in the presentation.

In a second aspect the present invention provides a method and system for providing an improved view of an object in a three dimensional environment on a display in a computer system, via a user event. The method comprises the step of providing a three-dimensional environment on the display, the three-dimensional environment including a plurality of objects, each of the plurality of objects appearing to be three-dimensional. The method and system further comprises providing a two-dimensional representation of at least one of the plurality of objects responsive to the user event.

The present invention provides for a system in which a three-dimensional virtual environment is combined with two-dimensional object presentation to create a user environment that is easy to navigate and productive to use for traditional computer-based tasks at the same time.

DETAILED DESCRIPTION

The present invention relates to organizing, navigating and using an object within a three-dimensional (3D) environment within a display on a computer system. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
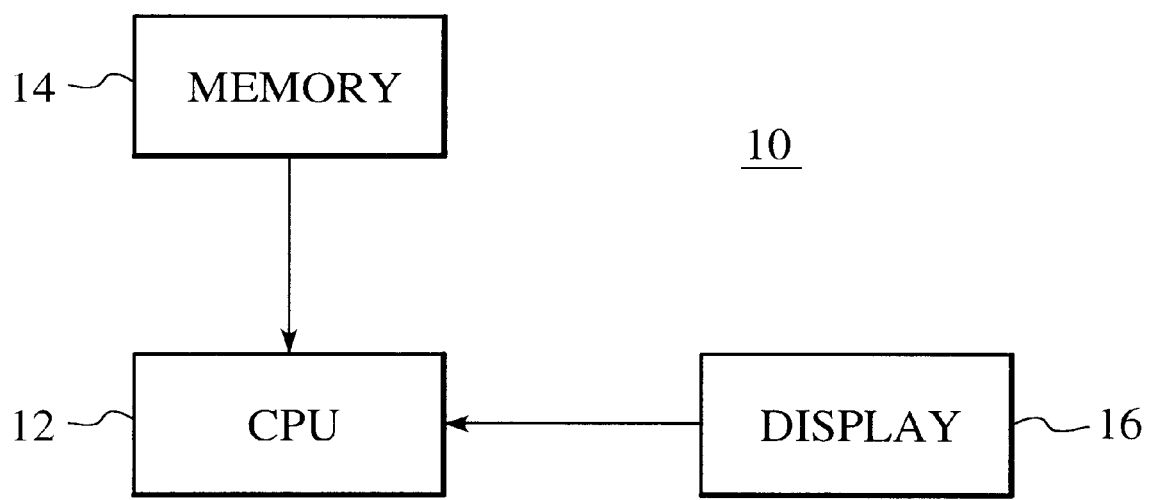
FIG. 1 is a block diagram of a computer system.
Figure 2:
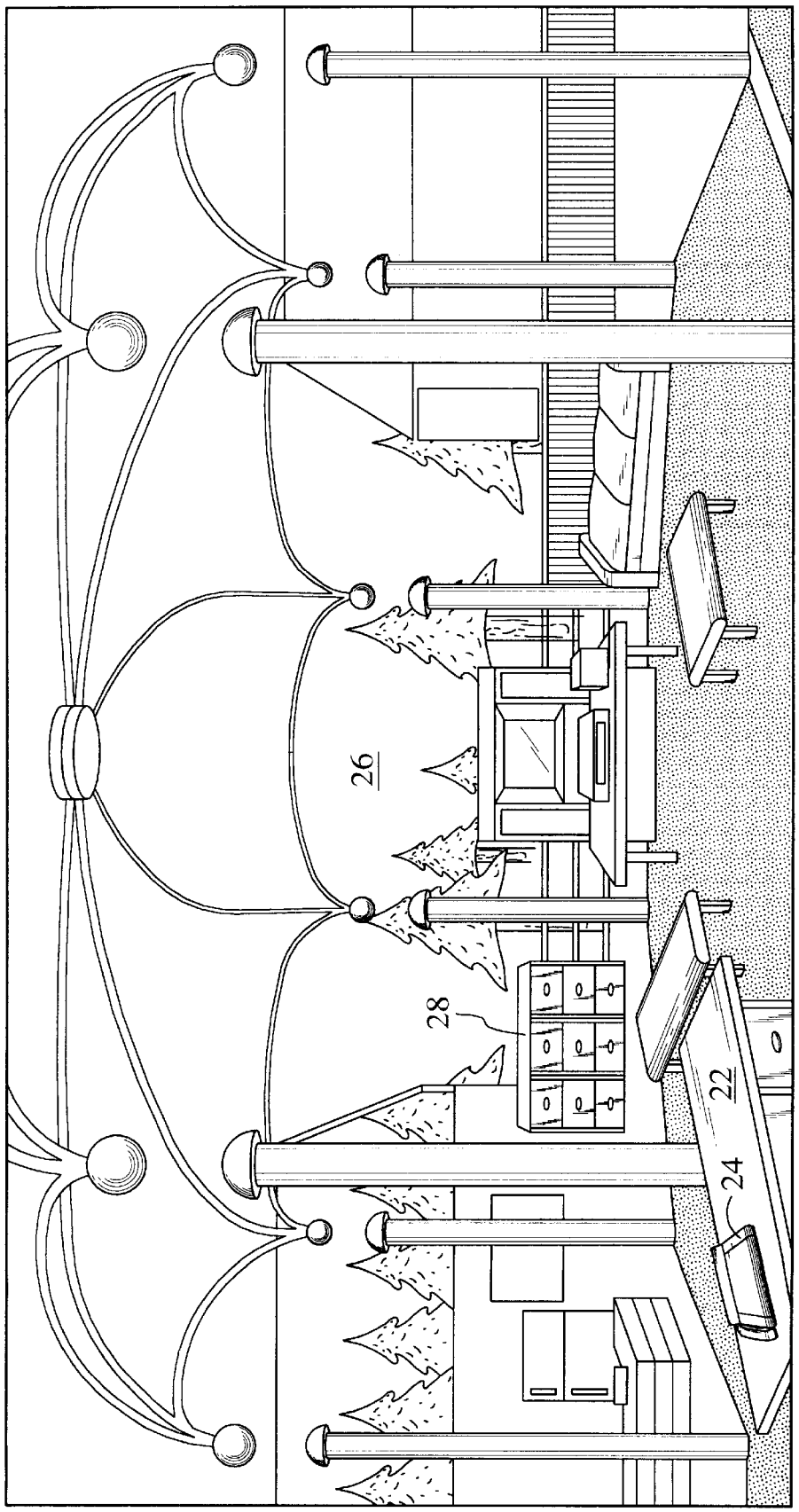
FIG. 2 is a three dimensional representation inside a home on a display of a computer system.

In the present invention, three dimensional ("3D") representations are utilized to show particular environments on a display 16 of a computer system 10 as shown in FIG. 1. For example, a home environment can be depicted on the display utilizing various 3D representations. Referring now to FIG. 2, what is shown is a 3D representation of a home 20 in which there is a desk 22, telephone 24, atrium 26, file cabinets 28, and other objects that make up the 3D representation. This 3D representation of certain of these objects can be containers for different information. For example, the desk 22 could include drawers, each of the drawers includes files, as in a typical office environment.

In a 3D environment in accordance with the present invention, a user viewpoint can navigate through the home in two ways. One way to navigate in the environment is for the user viewpoint to move through the home through the movement of the pointing (mouse, cursor or the like) device to simulate walking through the room. The other way to navigate in the environment is through providing certain events to facilitate the user viewpoint movement from one point to another through the 3D environment.

Hence, to facilitate this second example, it is desirable to use these objects as containers in the appropriate fashion to provide the particular information. So, for example, using a pointing device such as a mouse or the like in a Windows environment, a desk could be pointed to and clicked on, the user viewpoint would then move closer to the desk, in a position where the drawers could be seen. A particular drawer could be clicked on and then opened, revealing a plurality of files. Thereafter, a particular file could be clicked on, and a representation of that file would be removed from the drawer and provided for access to the user. Thereafter, the user could then click on the file and flip through the various documents in the file.

In another example, the telephone could be clicked on to bring the user viewpoint closer to the telephone. The user could then dial a number by using the keypad on the telephone to dial a particular number. In addition, there may be a fax facility on the telephone which could be used in which the computer system would then act as a fax machine. Accordingly, by using this 3D representation, using various objects in a 3D representation as containers rather than the typical Windows environment in which there are a plurality of windows and icons to be clicked on that may or may not be representative of the particular task that is to be performed, a system is provided in which it would be easier for a user to navigate and use in an expeditious and efficient manner.

This 3D representation allows for certain advantages while performing useful work. These advantages will be described below in conjunction with the accompanying figures.

World View and Work Plane

Figure 3:
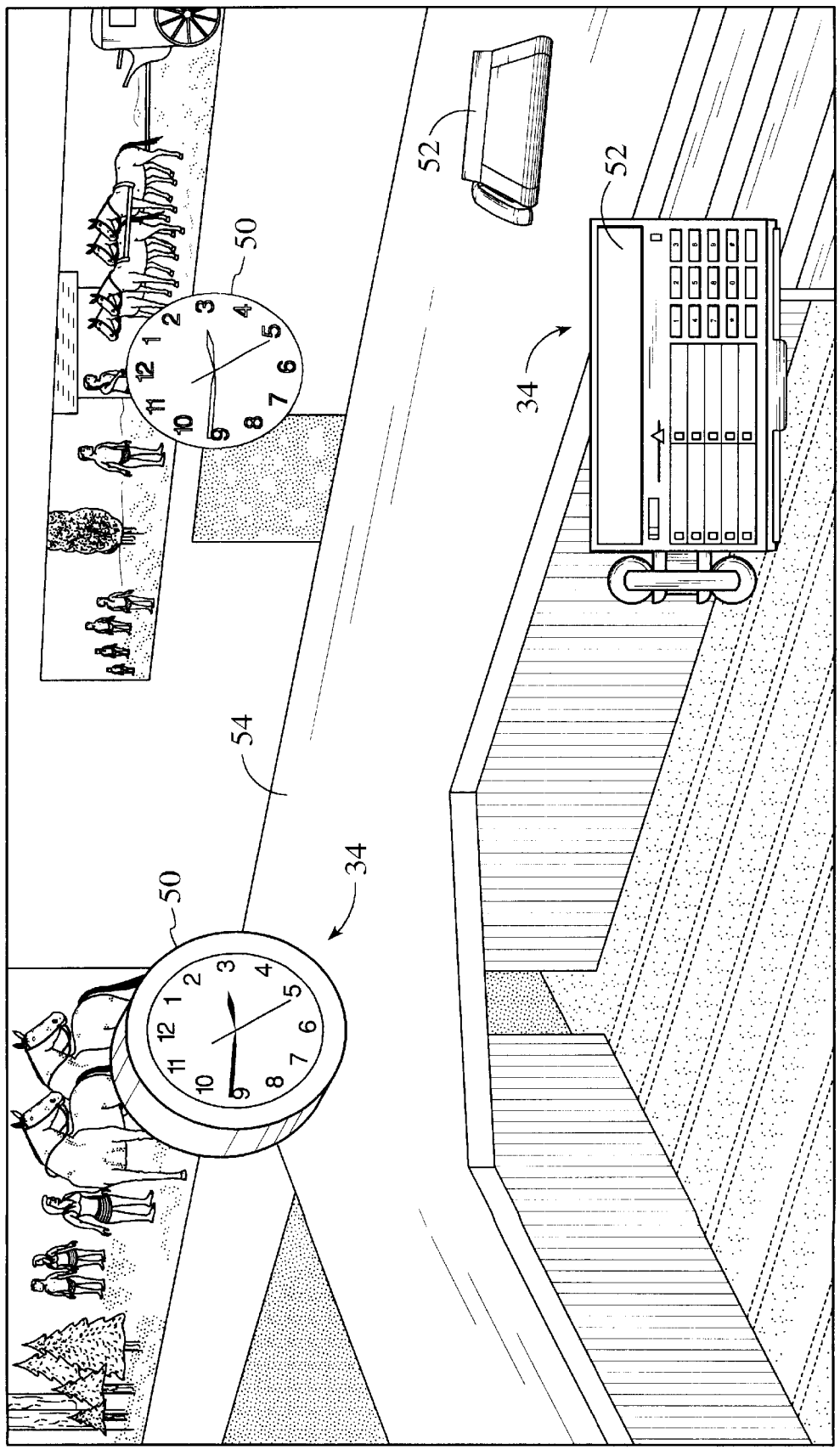
FIG. 3 shows a world view containing a clock and telephone on a desk.

FIG. 3 shows a world view 80 containing a clock 50 and telephone 52 on a desk 54. The user environment presents two distinct spaces: a world view 32 and a work plane. The world view is a 3D model. The world view can be utilized for storing and organizing things and for simple interaction with objects. The work plane presents 2D views of objects in front of the world view for detailed interaction with objects. Work views of the clock 50 and telephone 52 are in the work plane above the world.

Three dimensional (3D) presentations are known, for example, to be utilized in computer games or virtual reality world environments in a computer system. User interaction with objects in 3D spaces, such as found in computer games and in virtual reality world environments using virtual reality modeling language (VRML) on the Internet, is made difficult by the perspective projection inherent in 3D presentation. Commonly understood user controls, such as buttons, sliders, and text entry fields cannot be easily used when viewed from an angle. Ease of use and productivity will be crucial aspects of making 3D user environments easy to use and productive.

For example, while navigating in the 3D world the user might find a note pad in a drawer of a desk. Viewing the note pad at an angle of view in effect when the user discovered it would not be practical due to the angles involved. Moving the viewpoint to be perpendicular to the desk would also not be practical as the user might have to move "into" the desk drawer to be close enough to see an appropriate level of detail on the note pad. Perpendicular viewing has the additional disadvantage of being disorienting and does not facilitate the gathering and use of multiple objects at the same time in the performance of a single task and the user loses valuable context provided by surrounding objects. A system and method in accordance with the present invention overcomes these problems associated with the above noted navigation techniques.

A 2D presentation plane is used in conjunction with presentation of a 3D virtual world. The virtual world presents objects in perspective, and allows users to move through the world to organize and find objects. When the user finds an object of interest they may be able to interact with it in a limited manner within the 3D presentation. For example, the user might be able to open a drawer in a desk, or press a simple switch to turn a lamp on and off.

To work with more complex objects the user can request that a 2D view of the object be created in an imaginary plane in front of the 3D presentation. This imaginary plane is called the work plane and the 2D views of objects presented within it are called work views shown in FIG. 3.

Figure 4:
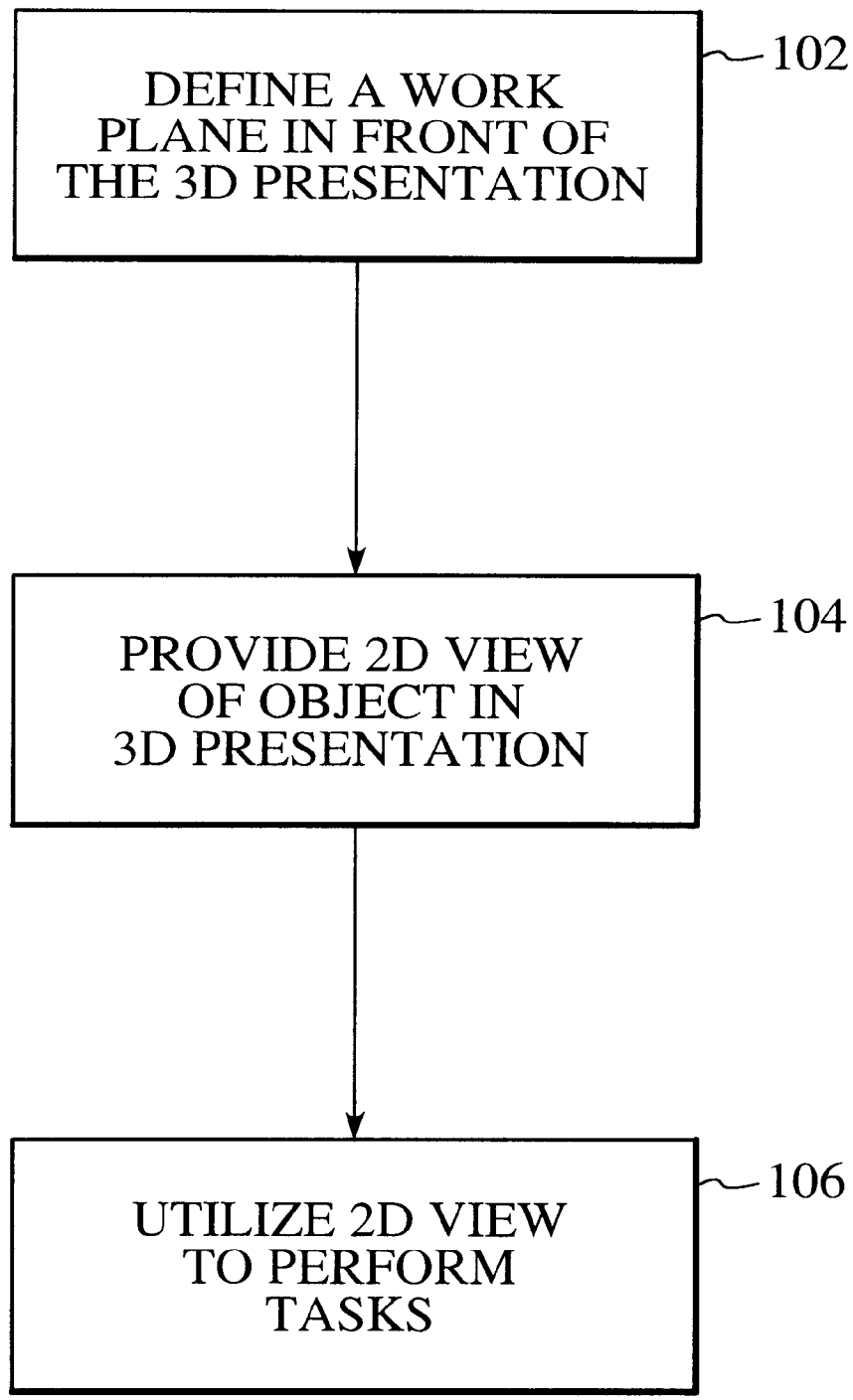
FIG. 4 is a flow chart showing a system in accordance with the present invention.

Referring now to FIG. 4, first a work plane is defined in front of the 3D presentation, via step 102. Thereafter, a 2D view or work view of an object in the 3D presentation is provided in the work plane, via step 104. The 2D view can then be utilized to perform appropriate tasks, via step 106. Presenting the 3D presentation simultaneously with the 2D view can be implemented advantageously in a variety of ways. For example, two separate programs can be utilized to run the 2D view and the 3D presentation through conventional screen management techniques.

By bringing objects of interest into 2D work views in the work plane, both user and designer have full benefit of the use of commonly known techniques for presenting 2D user interfaces. In addition, the user can select and bring into the work plane only those objects of interest in performing the task at hand. The objects themselves are not moved from their location in the 3D world presentation.

The work plane itself is transparent so users can see the 3D world underneath by looking between the work views. Navigation in the 3D world can still be performed while objects are displayed in the work plane, allowing users to find and "pick up" various objects needed to perform a task.

Figure 5:
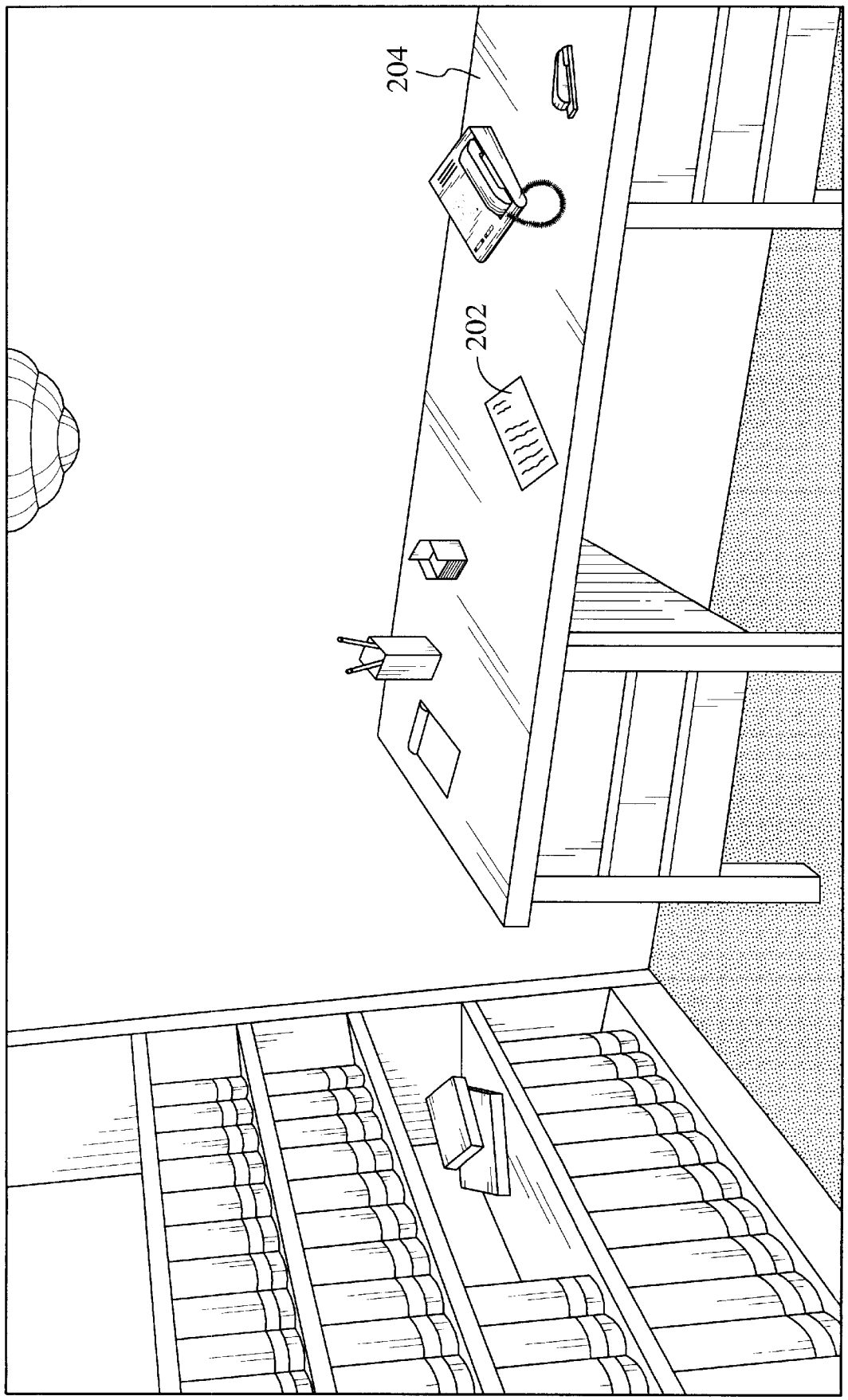
FIG. 5 shows a 3D representation of a note pad on a desk in conjunction with a 3D environment of a room.
Figure 6:
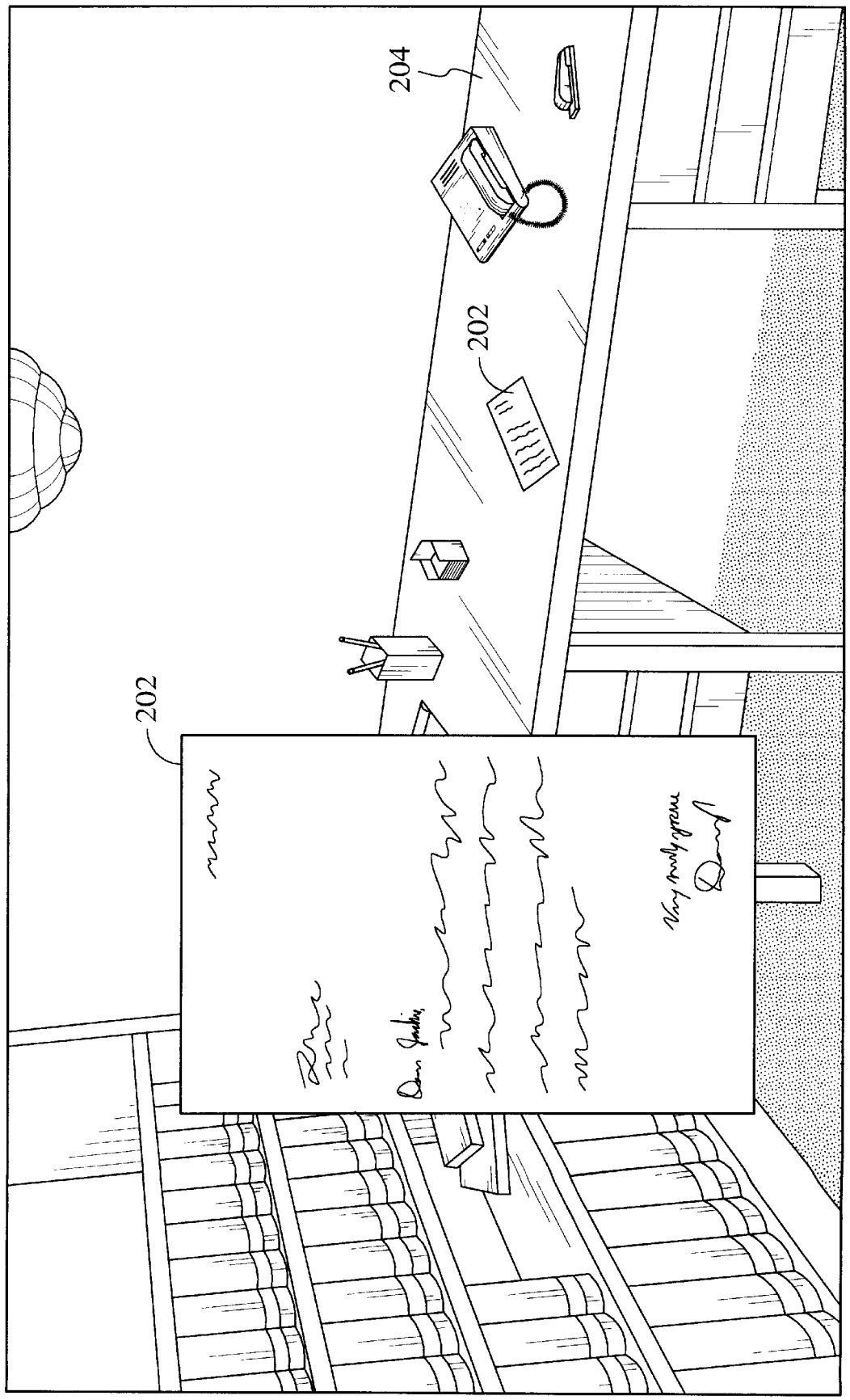
FIG. 6 shows the 2D representation of the pad in conjunction with a 3D environment of the office.

To provide an example of this, refer now to FIGS. 5 and 6. FIG. 5 shows a 3D representation of a note pad 202 on a desk 204 in conjunction with a 3D environment of a room. In this embodiment, the 3D representation of the pad is still on the desk 204. As is seen, however, in the 3D representation of the pad 202, it is difficult or impossible to view the writing on the pad 202. FIG. 6 shows the 2D representation of the pad 202 in conjunction with a 3D environment of the office 200. In this embodiment, the writing on the 2D representation of the note pad 202 can now be easily seen. The 3D representation of the note pad 202 remains on the desk 204.

Accordingly, through the use of the present invention, the combination of 2D and 3D presentations in a single view provides the benefits of both images simultaneously. A 3D presentation in which designers have organized objects logically, such as by following real-world metaphors like libraries, and in which users can organize objects themselves, allows a user to quickly understand where things are and find things they need. A 2D presentation of objects with which the user wants to do detailed work provides the best possible user interface for productivity. The simultaneous combination of 3D and 2D presentations provides optimum ease of use and productivity in a single seamless user environment.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for providing an improved view of an object on a display in a computer system via a user comprising the steps of:

(a) providing a work view in a three dimensional (3D) environment on the display, the three dimensional environment including a plurality of objects, wherein the work view is utilized for organizing the plurality of objects on the display and for navigation in the three dimensional environment; and providing a work plane simultaneously with the work view, wherein the work plane provides a two dimensional (2D) representation of at least one of the plurality of objects, the work plane utilized for performance of useful work on the at least one of the plurality of objects.

2. The method of claim 1 further comprising step (c) performing useful work on the at least one of the plurality of objects.

3. The method of claim 1 in which the object comprises a notepad.

4. The method of claim 3 further comprising writing in the 2D representation of the notepad.

5. A system for providing an improved view of an object on a display in a computer system via a user comprising:

means for providing a work view in a three dimensional (3D) environment on the display, the three dimensional environment including a plurality of objects, wherein the work view is utilized for organizing the plurality of objects and for navigation in the three dimensional environment; and means for providing a work plane simultaneously with the work view, wherein the work plane provides a two dimensional (2D) representation of at least one of the plurality of objects, the work plane utilized for performance of useful work on the at least one of the plurality of objects.

6. The system of claim 5 in which the object comprises a notepad.

7. The system of claim 6 further comprises means for writing in the 2D representation of the notepad.

8. A method for allowing for detailed interactions with a displayed three dimensional (3D) object, comprising the steps of:

(a) displaying a plurality of 3D objects; and (b) simultaneously displaying a two dimensional (2D) representation of one of the plurality of 3D objects, the 2D representation allowing for detailed interactions with the one of the plurality of 3D objects.

9. The method of claim 8, wherein the plurality of 3D objects are displayed in a work view, wherein the work view is utilized for organizing the plurality of 3D objects, for navigation in a 3D environment, and for simple interaction with the plurality of 3D objects.

10. The method of claim 9, wherein navigation in the 3D environment may be performed while the 2D representation is provided.

11. The method of claim 8, wherein the 2D representation is displayed in a work plane, the work plane simultaneously provided with a work view, wherein the work plane is utilized for detailed interaction with the one of the plurality of 3D objects.

12. The method of claim 11, wherein the work plane is provided in front of the work view.

13. The method of claim 11, wherein the work plane is transparent.

14. The method of claim 8, wherein the one of the plurality of 3D objects is simultaneously displayed upon the selection of the one of the 3D objects.

15. The method of claim 8, wherein simultaneously providing the plurality of 3D objects in a work view and the 2D representation in a work plane provides a single seamless user environment.

* * * * *